(12) United States Patent
Villamar et al.

(10) Patent No.: US 6,397,047 B1
(45) Date of Patent: May 28, 2002

(54) PORTABLE STORAGE CONTAINER FOR A RADIO

(76) Inventors: Ruben Villamar; Maria Villamar, both of 66 Hardscrabble Rd., Port Jervis, NY (US) 12771

(*) Notice: Subject to any disclaimer, the term of this patent is extended or adjusted under 35 U.S.C. 154(b) by 0 days.

(21) Appl. No.: 09/288,139

(22) Filed: Apr. 8, 1999

(51) Int. Cl.[7] .................................................. H04B 1/38
(52) U.S. Cl. ........................................ 455/90; 455/347
(58) Field of Search ............................ 455/90, 550, 66, 455/74, 344, 347, 348, 350, 351; 379/437; 206/372, 373; 190/100, 115, 116, 118

(56) References Cited

U.S. PATENT DOCUMENTS

| | | | | |
|---|---|---|---|---|
| 3,334,714 A | * | 8/1967 | Gordon | 206/372 |
| 4,132,295 A | * | 1/1979 | Hochfelsen | 190/60 |
| 4,677,654 A | * | 6/1987 | Lagin et al. | 455/90 |
| 5,020,137 A | * | 5/1991 | Barsumian | 455/90 |
| 5,232,276 A | * | 8/1993 | Martin | 312/208.4 |
| 5,404,583 A | * | 4/1995 | Lalezari et al. | 455/90 |

* cited by examiner

*Primary Examiner*—Lee Nguyen

(57) ABSTRACT

A portable storage container for a radio unit is provided including a selectively opened case constructed from a rigid material. Also included is at least one holder insert situated within the case. Next provided is a radio unit mounted within the holder insert in the case. A speaker is mounted within the case and connected to the radio unit for emitting audio signals received therefrom.

2 Claims, 2 Drawing Sheets

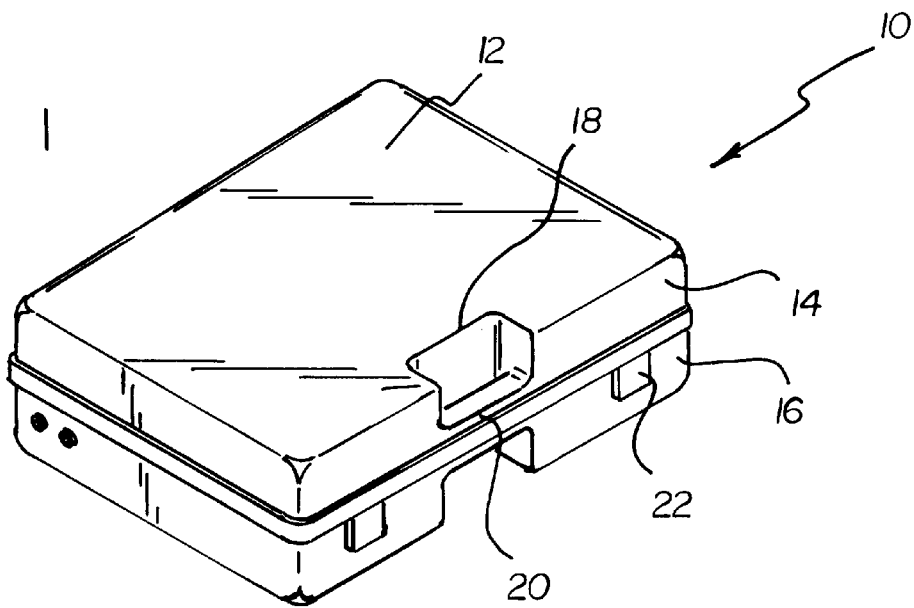
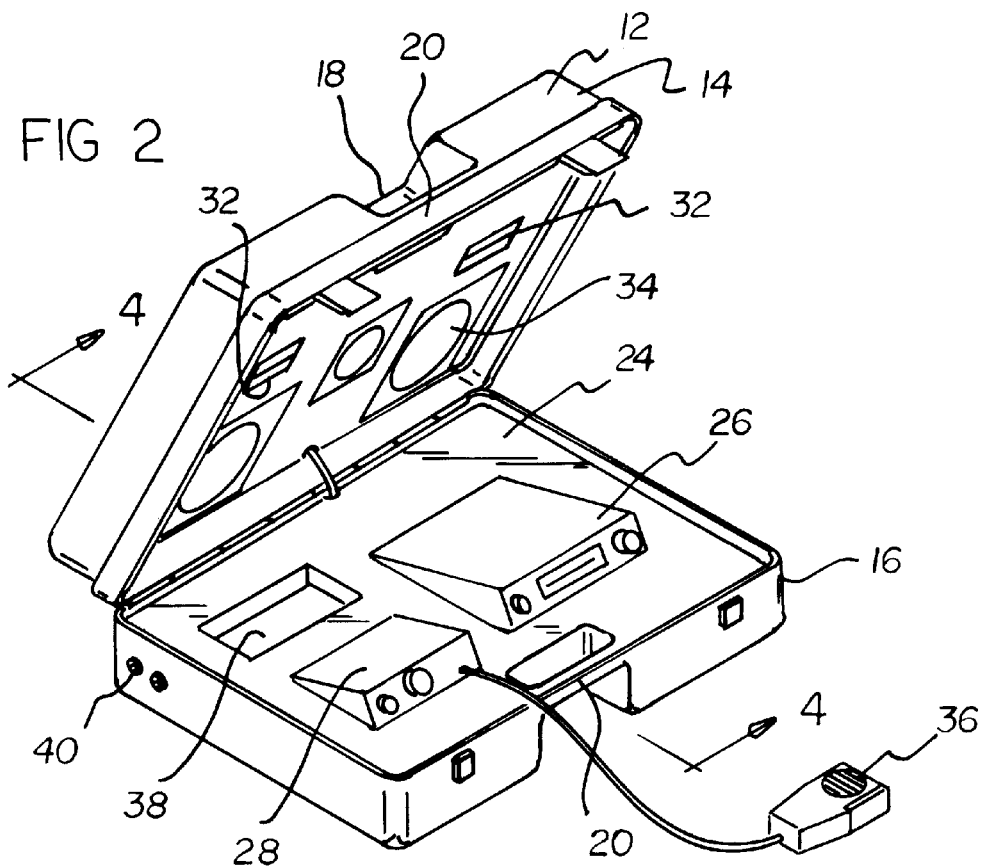

PORTABLE STORAGE CONTAINER FOR A RADIO

BACKGROUND OF THE INVENTION

1. Field of the Invention

The present invention relates to stand alone radio units and more particularly pertains to a new portable storage container for a radio unit for protectively storing and transporting radio units and the like.

2. Description of the Prior Art

The use of stand alone radio units is known in the prior art. More specifically, stand alone radio units heretofore devised and utilized are known to consist basically of familiar, expected and obvious structural configurations, notwithstanding the myriad of designs encompassed by the crowded prior art which have been developed for the fulfillment of countless objectives and requirements.

Known prior art stand alone radio units include U.S. Pat. Nos. 4,070,546; 5,349,575; U.S. Pat. Des. Nos. 342,253; 329,645; U.S. Pat. Nos. 4,184,115; and 4,418,426.

In these respects, the portable storage container for a radio unit according to the present invention substantially departs from the conventional concepts and designs of the prior art, and in so doing provides an apparatus primarily developed for the purpose of protectively storing and transporting radio units and the like.

SUMMARY OF THE INVENTION

In view of the foregoing disadvantages inherent in the known types of stand alone radio units now present in the prior art, the present invention provides a new portable storage container for a radio unit construction wherein the same can be utilized for protectively storing and transporting radio units and the like.

The general purpose of the present invention, which will be described subsequently in greater detail, is to provide a new portable storage container for a radio unit apparatus and method which has many of the advantages of the stand alone radio units mentioned heretofore and many novel features that result in a new portable storage container for a radio unit which is not anticipated, rendered obvious, suggested, or even implied by any of the prior art stand alone radio units, either alone or in any combination thereof.

To attain this, the present invention generally comprises a case constructed from a rigid plastic material. The case includes a top extent and a bottom extent each with a planar rectangular face and a peripheral side wall integrally coupled to the rectangular face. The side wall extends from the rectangular face in perpendicular relationship therewith for defining an interior space and an open face with a peripheral edge. The top extent and bottom extent each further has a front portion with a central rectangular cut out formed therein. As shown in FIGS. 1 & 2, a cross member is integrally coupled across the rectangular cut out in alignment with the peripheral edge. Rear portions of the top extent and the bottom extent of the case are pivotally coupled. Further, the front portions of the top extent and bottom extent have a pair of latches for selecting sealing the interior space. In use, the cross members are abutted when the top extent and bottom extent of the case are closed to form a handle. Next provided is a pair of foam inserts each having a rectangular configuration. The foam inserts are mounted within the top extent and bottom extent of the case, as shown in FIGS. 2 & 4. In use, the foam inserts define planar surfaces which are in parallel with and closely spaced from a plane including the peripheral edge of the corresponding extent of the case. Also included is a music radio unit and a citizen band radio unit. Each of such radio units has a thin rectilinear configuration and is mounted within a separate recess formed in the foam insert of the bottom extent of the case. As such, the radio units each reside along a plane which forms a 30 degree angle with the rectangular face of the bottom extent of the case. In use, front faces of the radio units emerge from the foam insert a predetermined height above the peripheral lip. Further, the radio units are positioned at least a predetermined distance from the rear portion of the bottom extent of the case. For receiving the front faces of the radio units when the case is closed, a pair of pyramidal-shaped recesses are formed in the foam insert of the top extent of the case. Such recesses are positioned at least the predetermined distance from the rear portion of the top extent of the case with a depth equal to the predetermined height. Mounted within the foam insert of the top extent of the case is a pair of speakers. To prevent interference with the radio units, the speakers are preferably situated a distance from the rear portion of the top extent of the case which is less than the predetermined distance. In use, the speakers are connected to the radio units for emitting audio signals received therefrom.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable storage container for a radio unit apparatus and method which has many of the advantages of the stand alone radio units mentioned heretofore and many novel features that result in a new portable storage container for a radio unit which is not anticipated, rendered obvious, suggested, or even implied by any of the prior art stand alone radio units, either alone or in any combination thereof.

It is another object of the present invention to provide a new portable storage container for a radio unit which may be easily and efficiently manufactured and marketed.

It is a further object of the present invention to provide a new portable storage container for a radio unit which is of a durable and reliable construction.

An even further object of the present invention is to provide a new portable storage container for a radio unit which is susceptible of a low cost of manufacture with regard to both materials and labor, and which accordingly is then susceptible of low prices of sale to the consuming public, thereby making such portable storage container for a radio unit economically available to the buying public.

Still yet another object of the present invention is to provide a new portable storage container for a radio unit which provides in the apparatuses and methods of the prior art some of the advantages thereof, while simultaneously overcoming some of the disadvantages normally associated therewith.

Still another object of the present invention is to provide a new portable storage container for a radio unit for protectively storing and transporting radio units and the like.

Even still another object of the present invention is to provide a new portable storage container for a radio unit that includes a selectively opened case constructed from a rigid material. Also included is at least one holder insert situated within the case. Next provided is a radio unit mounted within the holder insert in the case. A speaker is mounted within the case and connected to the radio unit for emitting audio signals received therefrom.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new portable storage container for a radio unit according to the present invention.

FIG. 2 is a perspective view of the case of the present invention in an open orientation.

DESCRIPTION OF THE PREFERRED EMBODIMENT

Figure 3:
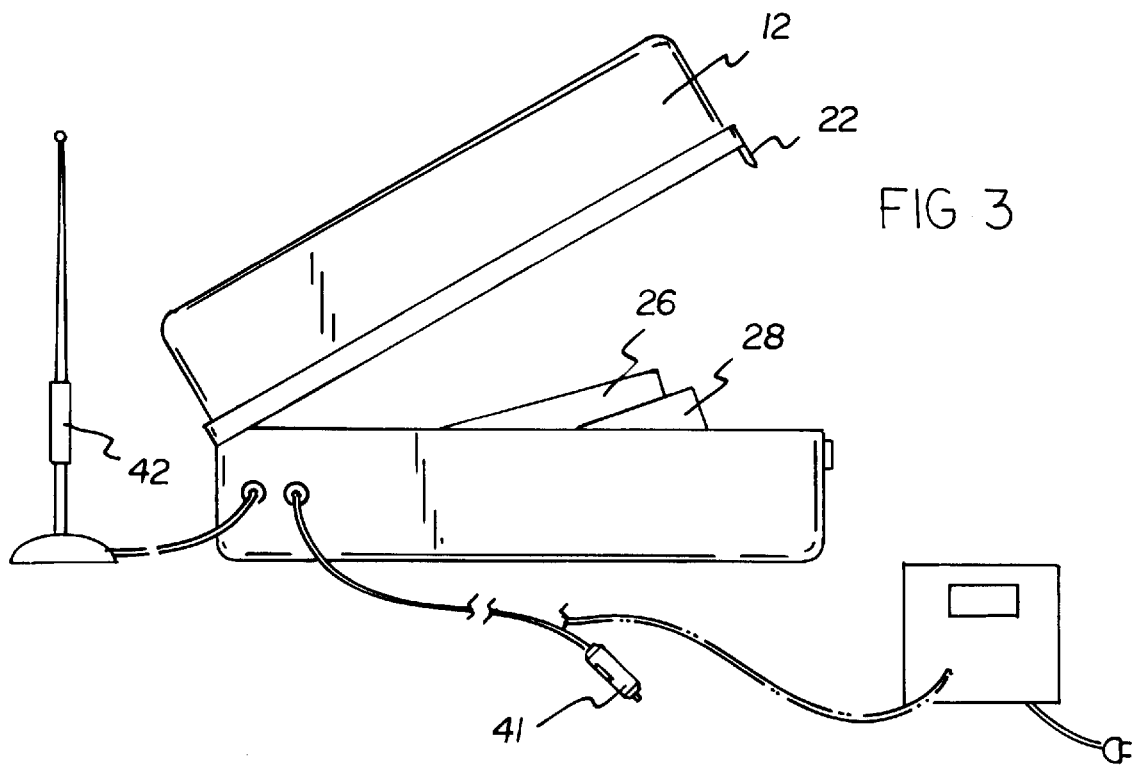
FIG. 3 is a side view of the case of the present invention in an open orientation.

With reference now to the drawings, and in particular to FIGS. 1 through 4 thereof, a new portable storage container for a radio unit embodying the principles and concepts of the present invention and generally designated by the reference numeral 10 will be described.

The present invention, designated as numeral 10, includes a case 12 constructed from a rigid plastic material. The case includes a top extent 14 and a bottom extent 16 each with a planar rectangular face and a peripheral side wall integrally coupled to the rectangular face. The side wall extends from the rectangular face in perpendicular relationship therewith for defining an interior space and an open face with a peripheral edge.

The top extent and bottom extent of the case each further has a front portion with a central rectangular cut out 18 formed therein. As shown in FIGS. 1 & 2, a cross member 20 is integrally coupled across each rectangular cut out in alignment with the peripheral edge of the associated extent. Rear portions of the top extent and the bottom extent of the case are pivotally coupled. Further, the front portions of the top extent and bottom extent have a pair of latches 22 for selecting sealing the interior space. Such latches each preferably includes a resilient latch and recess combination. In use, the cross members are abutted when the top extent and bottom extent of the case are closed to form a handle.

Figure 4:
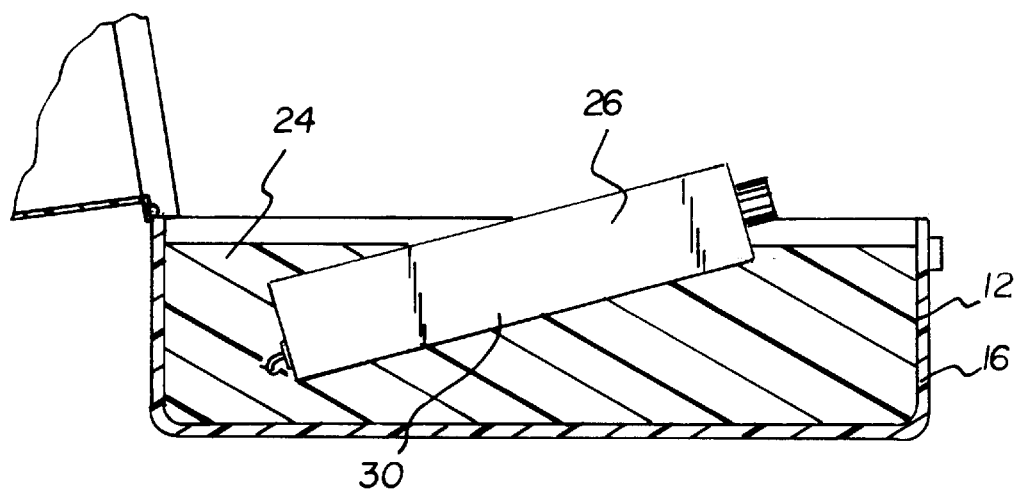
FIG. 4 is a side cross-sectional view of the present invention taken along line 4—4 shown in FIG. 2.

Next provided is a pair of foam inserts 24 each having a rectangular configuration. The foam inserts are mounted within the top extent and bottom extent of the case, as shown in FIGS. 2 & 4. In use, the foam inserts define planar surfaces which are in parallel with and closely spaced from a plane including the peripheral edge of the corresponding extent of the case. It should be noted that the foam inserts may be constructed from various other mediums with varying rigidity. Further, the surfaces of the foam may be lined with felt or the like.

Also included is a music radio unit 26 and a citizen band radio unit 28. It should be noted that the term radio units in the context of the present application includes compact disk players, tape players and other types of playback mechanisms or the like. Each of such radio units has a thin rectilinear configuration and is mounted within a separate recess 30 formed in the foam insert of the bottom extent of the case. As such, the radio units each reside along a plane which forms a 30 degree angle with the rectangular face of the bottom extent of the case. In use, front faces of the radio units emerge from the foam insert a predetermined height above the peripheral lip of the bottom extent of the case. Further, the radio units are positioned at least a predetermined distance from the rear portion of the bottom extent of the case.

For receiving the front faces of the radio units when the case is closed, a pair of pyramidal-shaped recesses 32 are formed in the foam insert of the top extent of the case. Such recesses are positioned at least the predetermined distance from the rear portion of the top extent of the case with a depth equal to the predetermined height.

Mounted within the foam insert of the top extent of the case is a pair of speakers 34. To prevent interference with the radio units, the speakers are preferably situated a distance from the rear portion of the top extent of the case which is less than the predetermined distance. In use, the speakers are connected to the radio units for emitting audio signals received therefrom. As an option, the citizen band radio unit may be equipped with a dedicated speaker.

For removably receiving a portable microphone 36 associated with the citizen band radio unit, a rectangular recess 38 is formed in the foam insert of the bottom extent of the case. In the preferred embodiment, the rectangular recess is positioned a distance from the rear portion of the bottom extent of the case which is less than the predetermined distance.

Finally, a pair of outlets 40 are each mounted to a side portion of the bottom extent of the case. Such outlets are connected to a power port and an antenna port of the radio units. In operation, the outlets are adapted for releasably receiving adapters connected to an external power source such as a cigarette lighter 41 and a stand alone antenna 42.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. Portable storage container for a citizen band and music radio unit comprising, in combination:
    a case constructed from a rigid plastic material and including a top extent and a bottom extent each with a planar rectangular face and a peripheral side wall integrally coupled to the rectangular face and extending therefrom in perpendicular relationship therewith for defining an interior space and an open face with a peripheral edge, the top extent and bottom extent each having a front portion with a central rectangular cut out formed therein with a cross member integrally coupled across the rectangular cut out in alignment with the peripheral edge, wherein rear portions of the top extent and the bottom extent are pivotally coupled and the front portions of the top extent and bottom extent further include a pair of latches for selecting sealing the interior space, wherein the cross members are abutted when the top extent and bottom extent of the case are closed to form a handle;
    a pair of foam inserts each having a rectangular configuration and mounted within the top extent and bottom extent of the case, wherein the foam inserts define planar surfaces which are in parallel with and closely spaced from a plane including the peripheral edge of the corresponding extent of the case;
    a music radio unit and a citizen band radio unit each having a thin rectilinear configuration and mounted within a separate recess formed in the foam insert of the bottom extent of the case such that the radio units each reside along a plane which forms a 30 degree angle with the rectangular face of the bottom extent of the case, wherein front faces of the radio units emerge from the foam insert a predetermined height above the peripheral lip and further at least a predetermined distance from the rear portion of the bottom extent of the case;
    a pair of pyramidal-shaped recesses formed in the foam insert of the top extent of the case at least the predetermined distance from the rear portion of the top extent of the case with a depth equal to the predetermined height for receiving the front faces of the radio units when the case is closed;
    a pair of speakers mounted within the foam insert of the top extent of the case a distance from the rear portion of the top extent of the case which is less than the predetermined distance, the speakers connected to the radio units for emitting audio signals received therefrom;
    a rectangular recess formed in the foam insert of the bottom extent of the case a distance from the rear portion of the bottom extent of the case which is less than the predetermined distance for removably receiving a portable microphone associated with the citizen band radio unit; and
    a pair of outlets each mounted to a side portion of the bottom extent of the case and connected to a power port and an antenna port of the radio units, the outlets adapted for releasably receiving adapters connected to an external power source and a stand alone antenna.

2. A portable storage container for a citizen band and music radio unit comprising, in combination:
    a case including a top extent and a bottom extent each with a face and a peripheral side wall integrally coupled to the face and extending therefrom in perpendicular relationship therewith for defining an interior space and an open face with a peripheral edge, the top extent and bottom extent each having a front portion with a central cut out formed therein with a cross member integrally coupled across the cut out in alignment with the peripheral edge, wherein rear portions of the top extent and the bottom extent are pivotally coupled and the front portions of the top extent and bottom extent further include a pair of latches for selecting sealing the interior space, wherein the cross members are abutted when the top extent and bottom extent of the case are closed to form a handle;
    a pair of foam inserts each mounted within the top extent and bottom extent of the case, wherein the foam inserts define planar surfaces which are in parallel with and closely spaced from a plane including the peripheral edge of the corresponding extent of the case;
    an AM/FM band radio unit and a citizen band radio unit each having a thin rectilinear configuration and mounted within a separate recess formed in the foam insert of the bottom extent of the case such that the radio units each reside along a plane which forms an angle with the face of the bottom extent of the case, wherein front faces of the radio units emerge from the foam insert a predetermined height above the peripheral lip and further at least a predetermined distance from the rear portion of the bottom extent of the case;
    a pair of recesses formed in the foam insert of the top extent of the case at least the predetermined distance from the rear portion of the top extent of the case with a depth equal to the predetermined height for receiving the front faces of the radio units when the case is closed;
    a pair of speakers mounted within the foam insert of the top extent of the case a distance from the rear portion of the top extent of the case which is less than the predetermined distance, the speakers connected to the radio units for emitting audio signals received therefrom;
    a recess formed in the foam insert of the bottom extent of the case a distance from the rear portion of the bottom extent of the case which is less than the predetermined distance for removably receiving a portable microphone associated with the citizen band radio unit; and
    a pair of outlets each mounted to a side portion of the bottom extent of the case and connected to a power port and an antenna port of the radio units, the outlets adapted for releasably receiving adapters connectable to an external power source and a stand alone antenna.

* * * * *